(12) United States Patent
Shindo et al.

(10) Patent No.: US 9,158,086 B2
(45) Date of Patent: Oct. 13, 2015

(54) LENS BARREL

(71) Applicant: Panasonic Corporation, Osaka (JP)

(72) Inventors: Koki Shindo, Osaka (JP); Akio Konishi, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/183,825

(22) Filed: Feb. 19, 2014

(65) Prior Publication Data

US 2014/0168797 A1   Jun. 19, 2014

Related U.S. Application Data

(63) Continuation of application No. PCT/JP2012/007191, filed on Nov. 8, 2012.

(30) Foreign Application Priority Data

Nov. 11, 2011   (JP) .................................. 2011-247621

(51) Int. Cl.
*G02B 7/02* (2006.01)
*G02B 5/00* (2006.01)

(52) U.S. Cl.
CPC . *G02B 7/02* (2013.01); *G02B 5/003* (2013.01)

(58) Field of Classification Search
CPC .................................. G02B 1/11; G02B 5/003
USPC ........................ 359/600–601, 611–614, 819
See application file for complete search history.

(56) References Cited

U.S. PATENT DOCUMENTS

| 7,530,699 | B2 | 5/2009 | Shulepova et al. | |
|---|---|---|---|---|
| 7,850,319 | B2 | 12/2010 | Yoshikawa et al. | |
| 8,507,841 | B2 * | 8/2013 | Endoh et al. | 250/216 |
| 8,576,486 | B2 * | 11/2013 | Hayashibe et al. | 359/581 |
| 2005/0243429 | A1 | 11/2005 | Shulepova et al. | |
| 2007/0247718 | A1 | 10/2007 | Yoshikawa et al. | |
| 2007/0291386 | A1 | 12/2007 | Yoshikawa et al. | |
| 2009/0257127 | A1 * | 10/2009 | Okayama et al. | 359/601 |
| 2010/0165468 | A1 * | 7/2010 | Yamada et al. | 359/613 |

FOREIGN PATENT DOCUMENTS

| JP | 07-020368 A | 1/1995 |
|---|---|---|
| JP | 07-027960 A | 1/1995 |
| JP | 2005-532589 A | 10/2005 |
| JP | 2006-293093 A | 10/2006 |
| JP | 2007-304466 A | 11/2007 |
| JP | 2008-500560 A | 1/2008 |
| JP | 2010-039006 A | 2/2010 |
| JP | 2010-219571 A | 9/2010 |
| WO | WO 2009/008168 A1 | 1/2009 |

OTHER PUBLICATIONS

International Search Report for corresponding International Application No. PCT/JP2012/007191 mailed Dec. 18, 2012.

* cited by examiner

*Primary Examiner* — Tuyen Tra
(74) *Attorney, Agent, or Firm* — Renner, Otto, Boisselle & Sklar, LLP

(57) ABSTRACT

A lens holding frame includes a plurality of conical protrusions. The plural conical protrusions include a pitch of greater than or equal to 0.1 mm and less than or equal to 2.0 mm.

9 Claims, 11 Drawing Sheets

// LENS BARREL

CROSS-REFERENCE TO RELATED APPLICATIONS

This is a continuation application of International Application PCT/JP2012/007191, with an international filing date of Nov. 8, 2012 which claims priority to Japanese Patent Application No. 2011-247621 filed on Nov. 11, 2011. The entire disclosures of International Application PCT/JP2012/007191 and Japanese Patent Application No. 2011-247621 are hereby incorporated herein by reference.

BACKGROUND

1. Technical Field

The technology disclosed herein relates to a lens barrel having a surface shape for scattering incident light.

2. Background Information

For a camera equipped with a lens barrel, a method has been conventionally proposed that extremely fine convexo-concave portions, aligned at a pitch (distance between adjacent apices) of less than or equal to light wavelength, are formed on the inner surface of the lens barrel (see Japan Laid-open Patent Application Publication No. JP-A-2007-304466).

However, the surface shape, formed by the fine convexo-concave portions described in the Publication No. JP-A-2007-304466, has a low strength and is easily damaged or broken. This poses a drawback of difficulty in handling of the surface shape in the assembling process of the lens barrel.

The present technology has been produced in view of the aforementioned situation. It is an object of the present technology to provide a lens barrel having a surface shape with an enhanced strength.

SUMMARY

A lens barrel disclosed herein includes a housing and an inner member disposed within the housing. At least either an inner surface of the housing or a surface of the inner member includes a surface shape formed by a plurality of conical protrusions. The plurality of conical protrusions are aligned at a pitch of greater than or equal to 0.1 mm and less than or equal to 2.0 mm.

According to the present technology, it is possible to provide a lens barrel having a surface shape with an enhanced strength.

BRIEF DESCRIPTION OF THE DRAWINGS

Referring now to the attached drawings which form a part of this original disclosure.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

Embodiment

Explanation will be hereinafter made for an example that a lens barrel is applied to a digital video camera.

1. Structure of Lens Barrel

Figure 1:
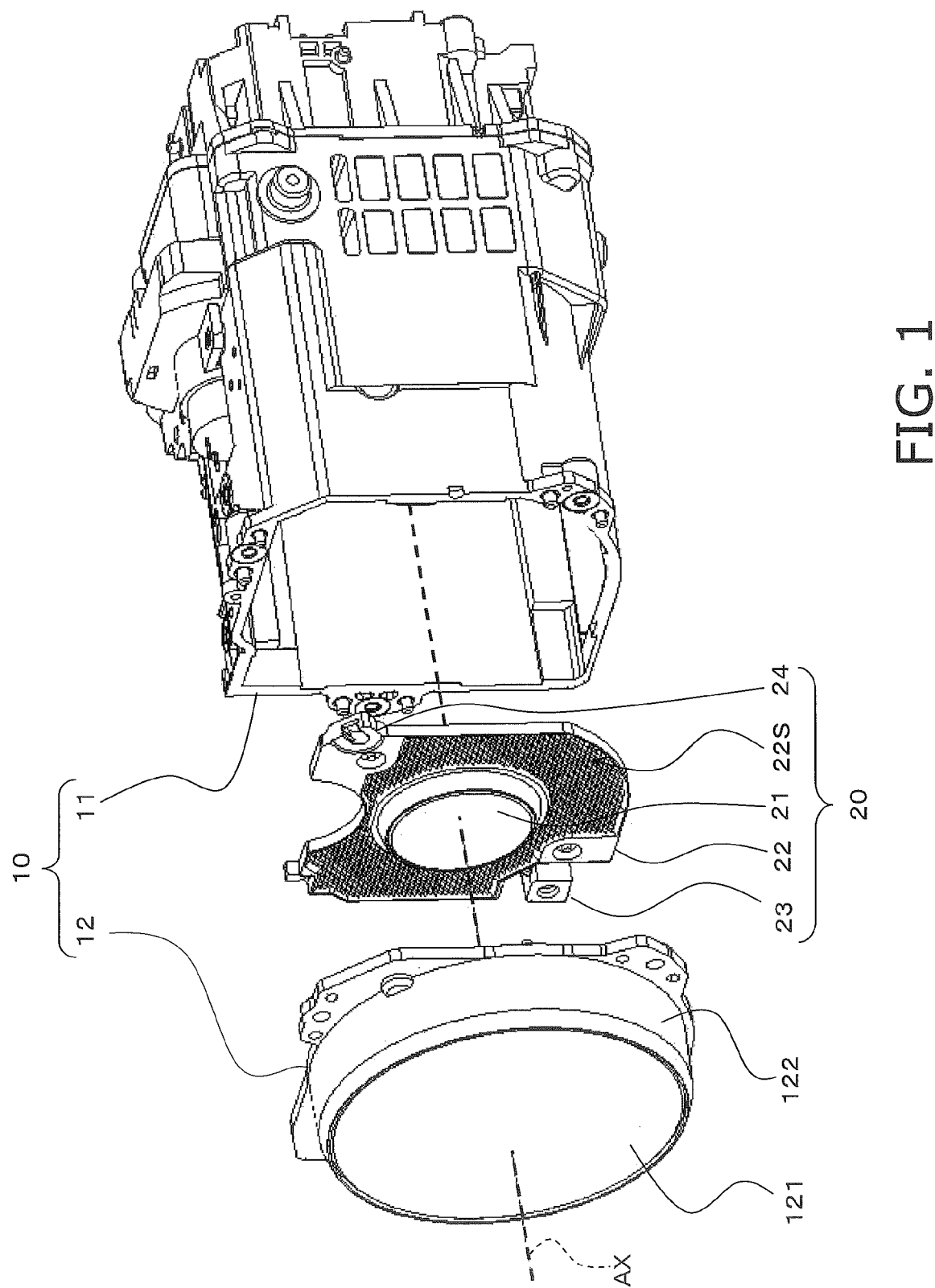
FIG. 1 is an exploded perspective view of a lens barrel.

Explanation will be made for a structure of a lens barrel 100 according to the present exemplary embodiment with reference to the drawings. FIG. 1 is an exploded perspective view of the lens barrel 100.

As shown in FIG. 1, the lens barrel 100 includes a housing 10 and a moving frame 20. The housing 10 includes a body frame 11 and a front frame 12.

The body frame 11 has a tubular shape, and accommodates not only the moving frame 20 but also a variety of elements (not shown in the drawings) such as a focus lens, a hand blurring correction lens and an image sensor.

The front frame 12 is fixed to the body frame 11 by means of screws. The front frame 12 includes a front lens 121, a front lens holding frame 122 for holding the front lens 121. The front lens 121 forms a part of an optical system to be embedded in the lens barrel 100. The front lens 121 is located nearest to an object among the elements composing the lens barrel 100. The front lens 121 takes a light ray from the object into the lens barrel 100. The front lens holding frame 122 has a tubular outer contour. The front lens 121 is attached to an object-side opening of the front lens holding frame 122.

The moving frame 20 includes a lens 21, a lens holding frame 22 for holding the lens 21, a bearing part 23 and a rotation stopper part 24. The lens 21 is configured to be moved along an optical axis AX in order to zoom in and out an object image to be focused on the image sensor (not shown in the drawings). It should be noted that the optical axis AX is a straight line connecting the center of the front lens 121 and that of the lens 21. The lens holding frame 22 is made in the form of a thin plate. The lens 21 is fitted into the middle of the lens holding frame 22. The lens holding frame 22 has a surface 22S located in opposition to the front lens 121. The lens holding frame 22 is preferably made of fiber contained resin. As the fiber, one can be used from the group consisting of glass fiber, carbon fiber and so forth. On the other hand, as the resin, one can be used from the group consisting of polycarbonate, polyamide, nylon, polyacetal, polyethylene terephthalate, polypropylene, polyphenylenesulfide, liquid crystal polymer and so forth. Therefore, although a lens barrel in general is made of glass-fiber contained polycarbonate material, the material of which the lens holding frame 22 is made is not limited to this.

Most of the incident light from the front lens 121 is herein taken into the lens 21, whereas a part of the incident light hits the surface 22S. When the light that has hit the surface 22S is reflected therefrom and taken in the lens 21, this will be a cause of occurrence of flare or ghost in a shot image. In view of this, the lens holding frame 22 according to the present exemplary embodiment has a light scattering shape on the surface 22S. The shape of the surface 22S will be described below.

The bearing part 23 is fixed to the lens holding frame 22. The rotation stopper part 24 is fixed to the lens holding frame 22, while being disposed on the opposite side of the bearing part 23 across the optical axis AX. Shafts, arranged in parallel to the optical axis AX, are respectively inserted into the bearing part 23 and the rotation stopper part 24. With the structure, the moving frame 20 is supported so as to be movable along the optical axis AX.

2. Surface Shape of Lens Holding Frame 22

Figure 2:
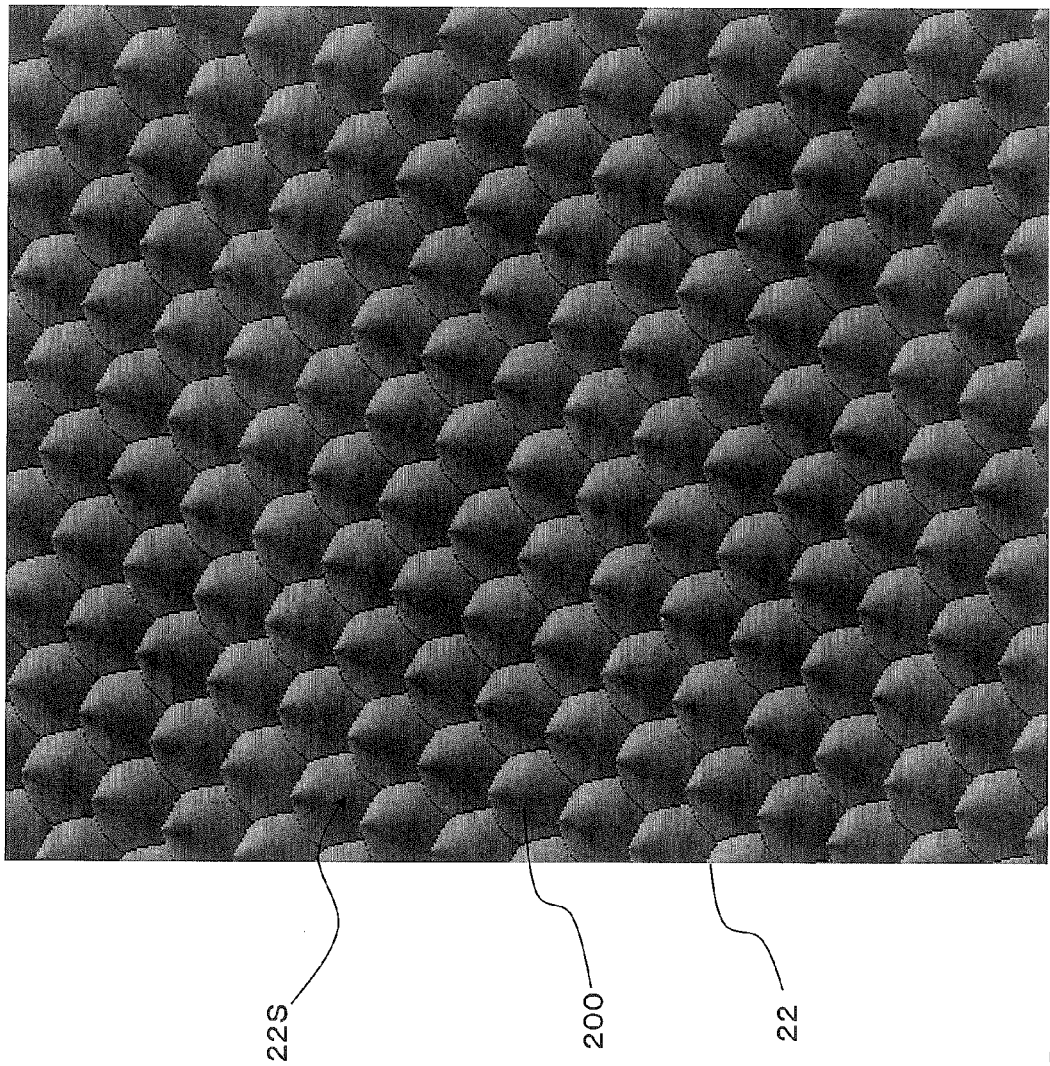
FIG. 2 is an enlarged perspective view of a moving frame.
Figure 3:
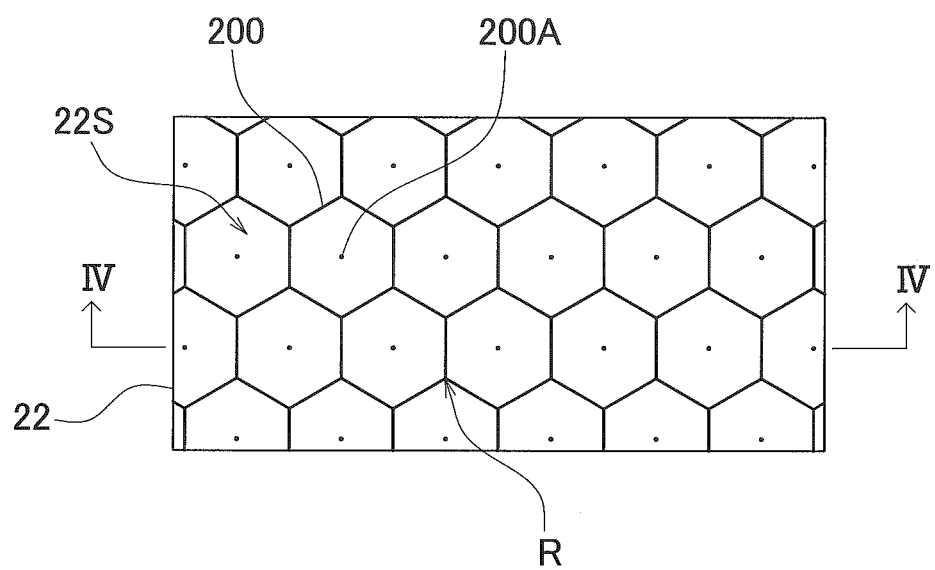
FIG. 3 is a plan view of the moving frame.
Figure 4:
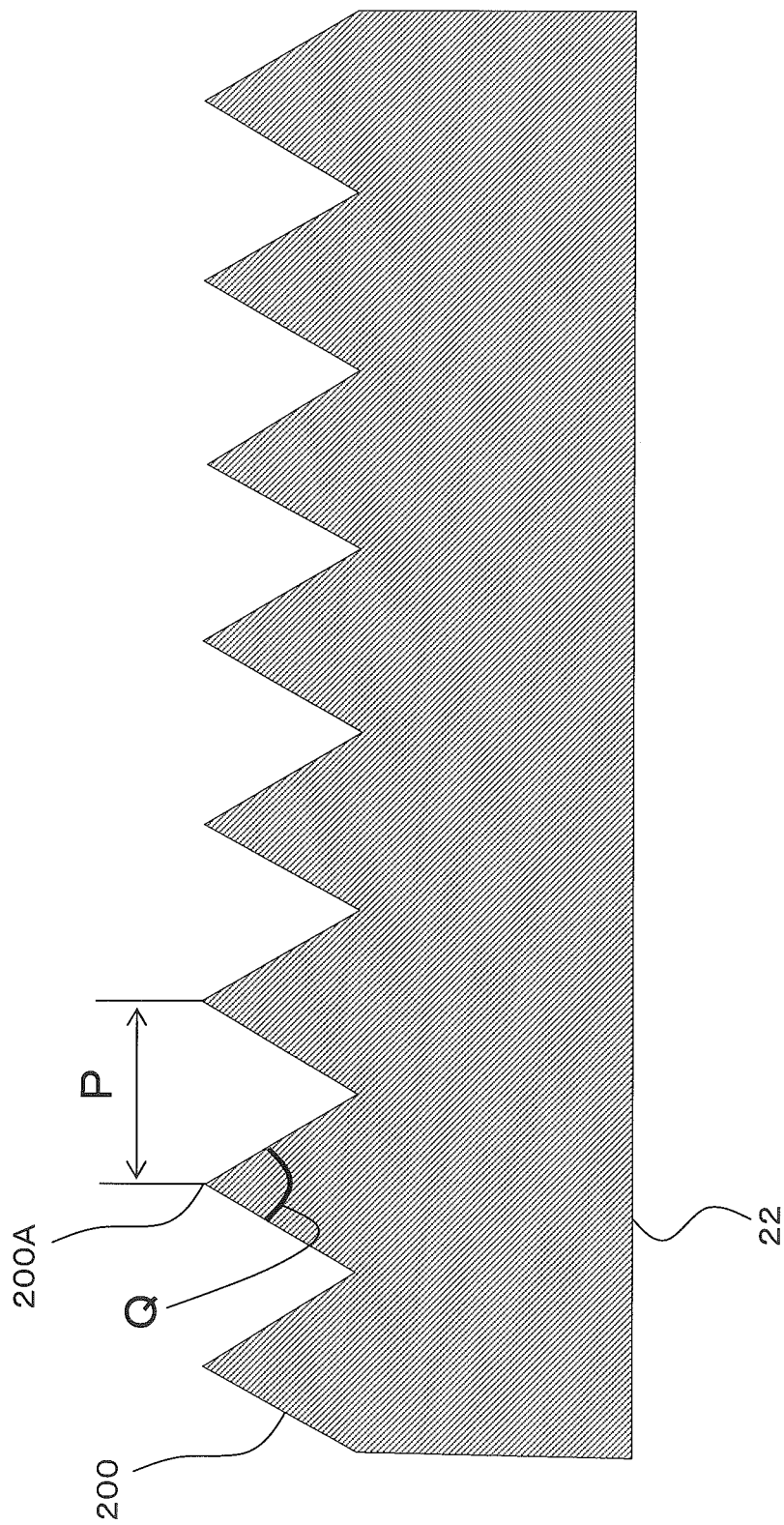
FIG. 4 is a cross-sectional view of FIG. 3 cut along a line IV-IV.

Next, explanation will be made for the surface shape of the lens holding frame 22 with reference to the drawings. FIG. 2 is an enlarged perspective view of the surface 22S. FIG. 3 is an enlarged plan view of the surface 22S. FIG. 4 is a cross-sectional view of FIG. 3 cut along a line IV-IV.

As shown in FIG. 2, the lens holding frame 22 has a plurality of conical protrusions 200 formed on the surface 22S. The surface shape of the lens holding frame 22 is formed by the plural conical protrusions 200. The plural conical protrusions 200 are disposed adjacently to each other so as to be densely packed as a whole. Each conical protrusion 200 is tapered towards the front lens 121.

As shown in FIG. 3, the base of each conical protrusion 200 is formed in a regular hexagonal shape in a plan view. The respective conical protrusions 200 are aligned without clearance such that each conical protrusion 200 shares the respective sides of its base with adjacent conical protrusions 200. Therefore, the slopes of adjacent two conical protrusions 200 are joined to each other without forming a flat surface between the adjacent two conical protrusions 200. Further, an apex 200A of each conical protrusion 200 is located in the center of the regular hexagon in a plan view. Therefore, a regular triangle is formed by the apices 200A of adjacent three conical protrusions 200.

As shown in FIG. 4, the interval (hereinafter referred to as "a pitch P") between the apices 200A of adjacent two conical protrusions 200 is preferably set to be greater than or equal to 0.1 mm and less than or equal to 2.0 mm, and is more preferably set to be greater than or equal to 0.2 mm and less than or equal to 0.7 mm. Further, the angle (hereinafter referred to as "an apex angle Q") of the apex 200A of each conical protrusion 200 is preferably set to be greater than or equal to 30 degrees and less than or equal to 90 degrees, and is more preferably set to be greater than or equal to 50 degrees and less than or equal to 70 degrees.

The height H of each conical protrusion 200 is unambiguously defined based on the pitch P and the apex angle Q of the conical protrusions 200, where the slopes of the conical protrusions 200 are entirely joined to each other. Specifically, the height H of each conical protrusion 200 having a regular hexagonal flat base can be derived from the following formula (1).

[Math. 1]

$$H = \frac{P}{\sqrt{3} \times \tan\frac{Q}{2}} \quad (1)$$

Thus, where the pitch P is 0.3 mm and the apex angle Q is 60 degrees, for instance, the height H can be derived as 0.3 mm. It should be noted that the height H, derived from the formula (1), is a height with reference to an intersection of three conical protrusions 200 (see a reference point R in FIG. 3). In other words, the height H of each conical protrusion 200 is an interval between the reference point R and the apex 200A in a direction perpendicular to the surface 22S. It should be noted that the reference point R is the lowest point on the surface 22S, and the thickness of the lens holding frame 22 is the thinnest at the reference point R.

Incidentally, it is demanded to suppress the thickness of the lens holding frame 22 for achieving compactness in size. However, when the thickness of the lens holding frame 22 is reduced and the height of each conical protrusion 200 is increased, the strength of the lens holding frame 22 is inevitably degraded. Therefore, it is preferable to arbitrarily set the height H of each conical protrusion 200 in accordance with the thickness of the lens holding frame 22. In other words, it is preferable to set the pitch P and the apex angle Q of each conical protrusion 200 in accordance with the thickness of the lens holding frame 22.

3. Method of Manufacturing Lens Holding Frame 22

First, a plurality of conical recesses are formed on a molding die. The shapes of the plural conical recesses are matched with those of the plural conical protrusions 200. Therefore, each recess is only required to be formed in a conical shape, and can be easily formed by means of a spinning drill.

Next, injection molding of glass-fiber contained polycarbonate material is performed using the molding die on which the plural recesses are formed. The lens holding frame 22 is then removed from the molding die after cooling.

It should be noted that the method of molding glass-fiber contained polycarbonate material is not limited to injection molding, and alternatively, extrusion molding, blow molding or so forth can be employed.

4. Summary (1) In the present exemplary embodiment, the lens holding frame 22 has the surface shape formed by the plural conical protrusions 200. The pitch P of the plural conical protrusions 200 is greater than or equal to 0.1 mm and less than or equal to 2.0 mm.

Thus, the plural conical protrusions 200 are formed on the surface 22S of the lens holding frame 22. Hence, it is possible to inhibit occurrence of flare and ghost attributed to the reflected light on the lens holding frame 22.

Further, the pitch P of the plural conical protrusions 200 is greater than or equal to 0.1 mm. Therefore, the outer contour of each conical protrusion 200 can be enlarged in comparison with that when the pitch P is set to be less than or equal to the wavelength of light. The strength of each conical protrusion 200 can be thereby enhanced. Hence, the conical protrusions 200 can be inhibited from being damaged or broken in the assembling process of the lens barrel 100.

Further, the pitch P of the plural conical protrusions 200 is less than or equal to 2.0 mm. Therefore, the thickness of the lens holding frame 22 can be reduced. Hence, reduction in size of the lens holding frame 22 can be achieved.

Further, when the lens holding frame 22 as described above is manufactured with a die, the die can be easily and conveniently fabricated by performing drilling for the surface of the die. In addition, manufacturing cost can be further reduced in comparison with that required when black paint is applied to the surface 22S.

(2) In the present exemplary embodiment, the lens holding frame 22 is made of glass polycarbonate.

Glass polycarbonate is a light-weight and high-strength material, and is therefore preferable as the material of the lens holding frame 22. However, glass polycarbonate contains glass fiber. This makes it difficult to form convexo-concave portions with a pitch of less than or equal to the wavelength of light. By contrast, in the present exemplary embodiment, the pitch P of the plural conical protrusions 200 is greater than or equal to 0.1 mm and less than or equal to 2.0 mm. Hence, glass polycarbonate can be suitably used in the present exemplary embodiment.

(3) In the present exemplary embodiment, the apex angle Q of each conical protrusion 200 is greater than or equal to 30 degrees and less than or equal to 90 degrees in a side view. Therefore, light scattering performance can be further enhanced on the surface 22S of the lens holding frame 22. Accordingly, reflectance can be reduced.

(4) In the present exemplary embodiment, the pitch P of the plural conical protrusions 200 is more preferably greater than or equal to 0.2 mm. Required strength can be thereby reliably achieved for the conical protrusions 200. Further, the pitch P of the plural conical protrusions 200 is more preferably less than or equal to 0.7 mm. The lens holding frame 22 can be thereby formed with a sufficiently thin thickness.

(5) In the present exemplary embodiment, the slopes of each conical protrusion 200 are joined to those of adjacent conical protrusions 200. Therefore, no flat surface is formed among the respective conical protrusions 200. This can inhibit perpendicular reflection of incident light. Therefore, light scattering performance can be further enhanced on the lens holding frame 22.

(6) In the present exemplary embodiment, the base of each conical protrusion 200 is formed in a regular hexagonal shape in a plan view. Therefore, the intervals among the plural conical protrusions 200 can be reduced. Hence, the height H of each conical protrusion 200 can be further reduced under the condition where the respective conical protrusions 200 have the same pitch P and the same apex angle Q. Accordingly, required light scattering performance can be maintained, while the lens holding frame 22 can be formed with a thin thickness.

5. Other Exemplary Embodiments

The present technology has been described in the aforementioned exemplary embodiment. However, it should not be understood that description and drawings, forming a part of this disclosure, are intended to limit the present technology. Various alternative exemplary embodiments, practical examples and operational techniques of the present technology would be apparent for those skilled in the art from this disclosure.

Figure 5:
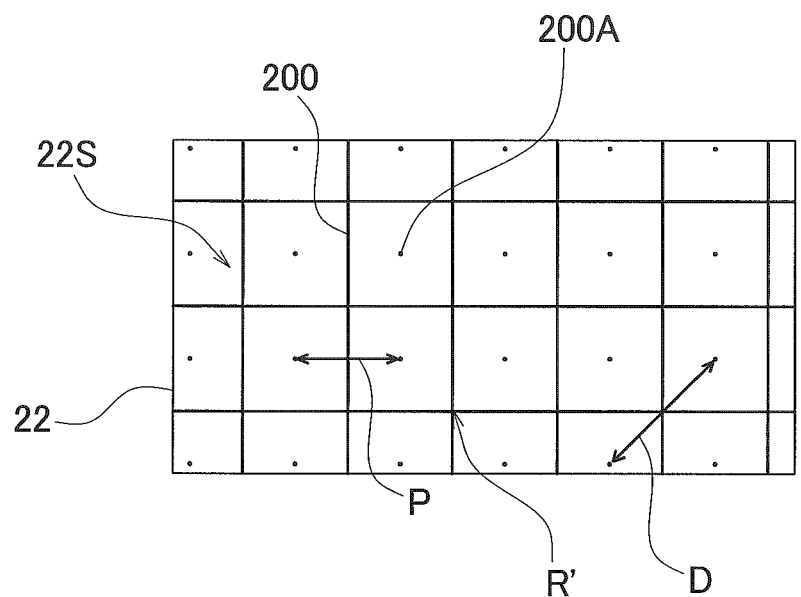
FIG. 5 is a plan view of the moving frame.

(A) In the aforementioned exemplary embodiment, the base of each conical protrusion 200 is formed in a regular hexagonal shape, and the apices 200A of adjacent three conical protrusions 200 form a regular triangle in a plan view. However, the present technology is not limited to the configuration. For example, as shown in FIG. 5, the base of each conical protrusion 200 may be formed in a square shape, and the apices 200A of adjacent four conical protrusions 200 may form a square shape in a plan view. The conical protrusions 200 are disposed at equal intervals of pitch P. It should be noted that the conical protrusions 200 in FIG. 5 can be considered to be disposed at equal intervals D. The minimum of the intervals among the apices 200A is herein referred to as the pitch P.

Further, a height H' of each conical protrusion 200 having a square flat base can be derived from the following formula (2).

[Math. 2]

$$H' = \frac{P}{\sqrt{2} \times \tan\frac{Q}{2}} \quad (2)$$

Thus, where the pitch P is 0.3 mm and the apex angle Q is 60 degrees, for instance, the height H' can be derived as 0.367 mm. On the other hand, where the pitch P is 2.0 mm and the apex angle Q is 30 degrees, the height H' can be derived as 5.278 mm. It should be noted that the height H', derived from the formula (2), is a height with reference to an intersection of four conical protrusions 200 (see a reference point R' in FIG. 5).

(B) In the aforementioned exemplary embodiment, the lens holding frame 22 has the surface shape formed by the plural conical protrusions 200. However, the present technology is not limited to the configuration.

Figure 6:
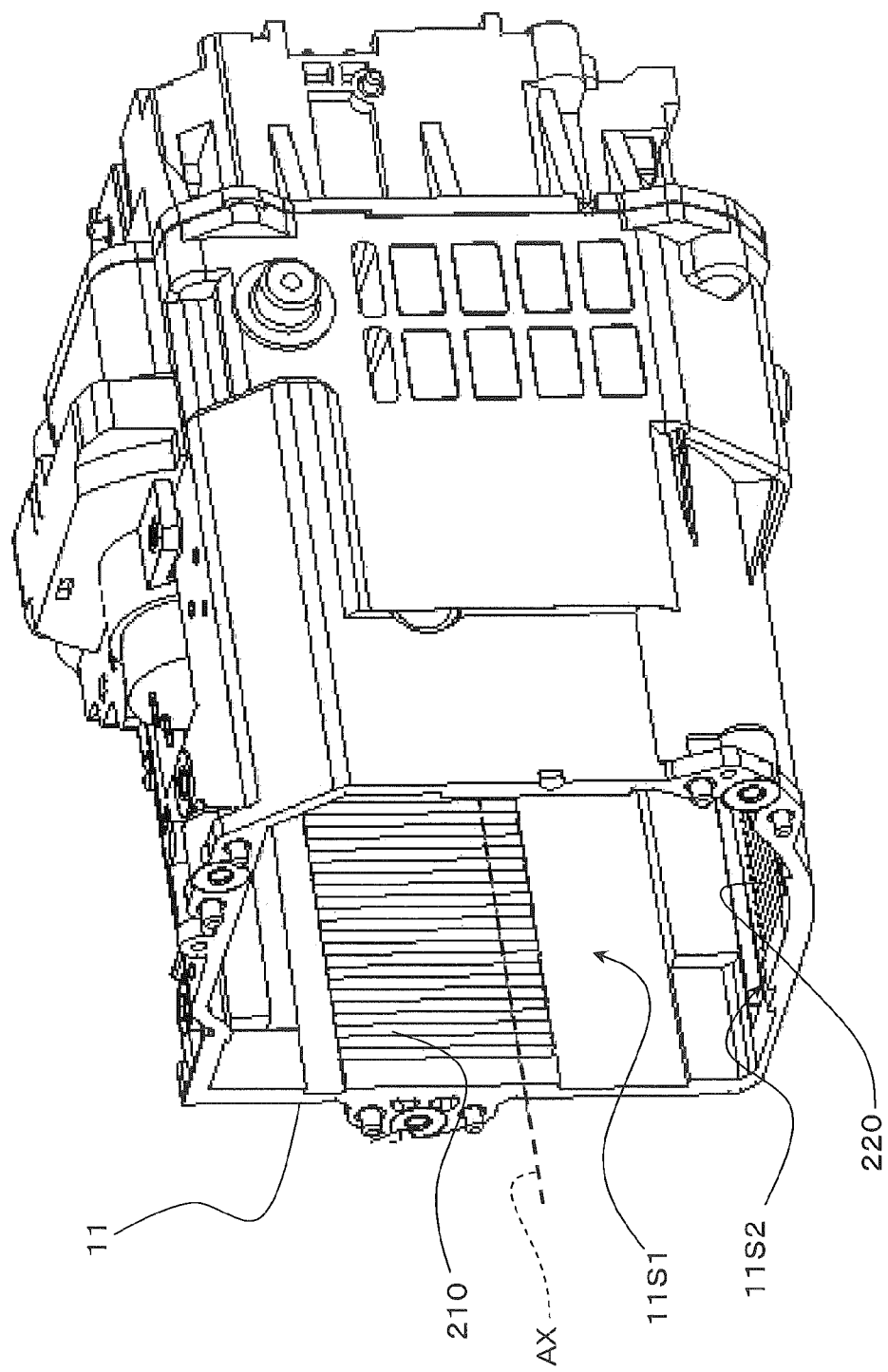
FIG. 6 is a perspective view of an inner surface of a body frame.

For example, as shown in FIG. 6, the surface shape for scattering incident light may be composed of a plurality of conical protrusions 210 formed on an inner slope 11S1 of the body frame 11 and a plurality of conical protrusions 220 formed on an inner bottom surface 11S2 of the body frame 11. In the example, occurrence of flare and ghost can be inhibited by the reflected light from the inner slope 11S1 and the inner bottom surface 11S2 of the body frame 11.

Further, when the tubular front frame 12 is elongated, it is effective to form the surface shape formed by the plural conical protrusions 200 on the inner peripheral surface of the front frame 12. In the example, occurrence of flare and ghost can be inhibited by the reflected light from the inner peripheral surface of the front frame 12.

Further, it is also possible to apply the surface shape formed by the plural conical protrusions 200 to the lens surface of the lens 21. When the lens 21 is made of plastic material, the conical protrusions 200 can be easily formed on the lens surface. It should be noted that the surface shape according to the present exemplary embodiment is also applicable to other lenses not shown in the drawings such as the focus lens and the hand blurring correction lens.

Thus, the surface shape according to the present technology can be formed on the inner surface of the housing 10, the lens surface and so forth.

Figure 7:
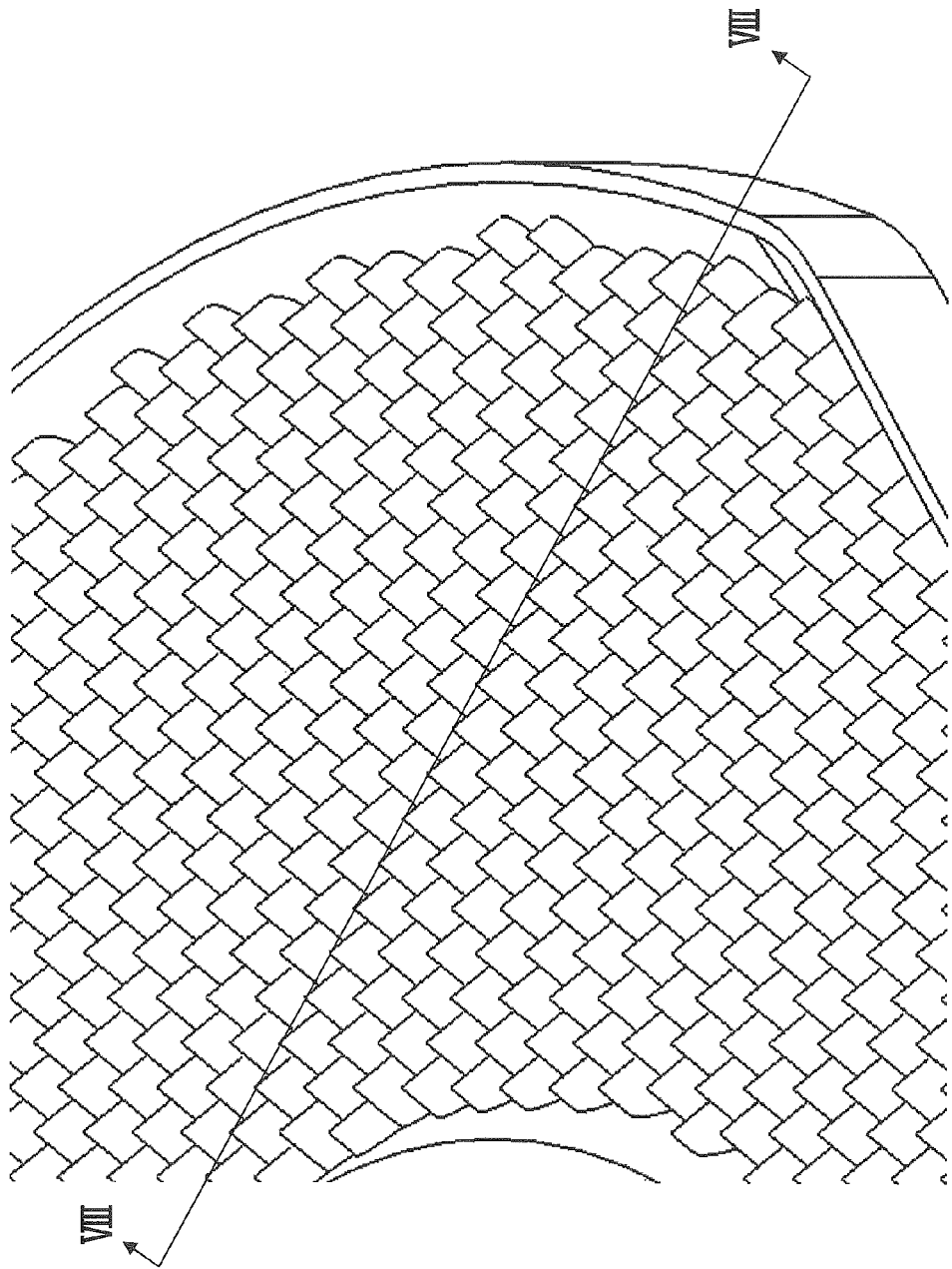
FIG. 7 is an enlarged perspective view of the moving frame.
Figure 8:
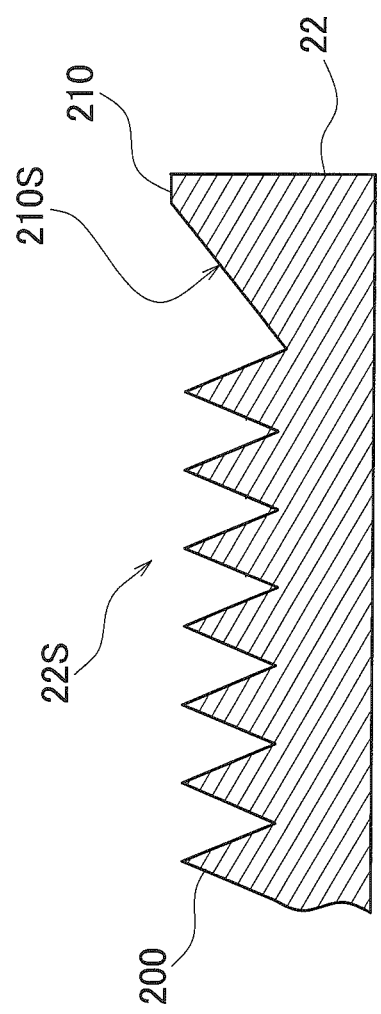
FIG. 8 is a cross-sectional view of FIG. 7 cut along a line VIII-VIII.

(C) In the aforementioned exemplary embodiment, the plural conical protrusions 200 are formed on the surface 22S from edge to edge of the surface 22S as shown in FIG. 1. However, the present technology is not limited to the configuration. For example, as shown in FIGS. 7 and 8, an annular tapered part 210 may be formed on the surface 22S so as to enclose the outer periphery of the plural conical protrusions 200. The annular tapered part 210 has a inclined surface 210S slanted with respect to the optical axis AX. Thus, incident light can be further scattered by the inclined surface 210S formed along the outer edge of the conical protrusions 200. Further, as shown in FIG. 8, the inclined surface 210S is preferably joined to the slopes of the conical protrusions 200. With the structure, no flat surface is formed between the conical protrusions 200 and the annular tapered part 210. Hence, perpendicular reflection of incident light can be further inhibited.

(D) In the aforementioned exemplary embodiment, the example has been explained that the lens barrel according to the present technology is applied to the digital video camera. However, the present technology is not limited to the configuration. The lens barrel can be suitably applied to digital still cameras, mobile phones, tablet devices, printers, scanners and optical devices in which an optical system such as an optical pickup device is embedded.

(E) In the aforementioned exemplary embodiment, the slopes of each conical protrusion 200 are entirely joined to the slopes of its adjacent six conical protrusions 200 as shown in FIG. 3. However, the present technology is not limited to the configuration. The slopes of each conical protrusion 200 are only required to be at least partially joined to the slopes of its adjacent conical protrusions 200. Even in the example, it is possible to reduce the area of the flat surface to be formed between adjacent conical protrusions 200.

(F) In the aforementioned exemplary embodiment, the plural conical protrusions 200 are disposed at equal intervals. However, the present technology is not limited to the configuration. The plural conical protrusions 200 may be at least partially disposed at irregular intervals.

Thus, it is apparent that the present technology encompasses a variety of embodiments and so forth not herein described. Therefore, the scope of the present technology is defined only by the subject matter in the appended claims valid based on the aforementioned explanation.

PRACTICAL EXAMPLES

Specific explanation will be hereinafter made for practical examples of the surface shape according to the present technology. However, it should be understood that the present technology is not limited to the following practical examples and can be arbitrarily changed and implemented without changing the scope of the present technology.

PRACTICAL EXAMPLES

Plate members, respectively having the surface shapes according to practical examples 1 to 4, were fabricated as follows.

First, conical recesses were formed in a matrix manner on the surface of a stationary die by means of a spinning drill.

Next, a movable die was combined with the stationary die, and glass-fiber contained polycarbonate material was injected between the stationary die and the movable die.

Next, the movable die was detached from the stationary die after cooling of the injected polycarbonate material, and further, the plate member was taken out. The surface shape, formed by conical protrusions arranged in a matrix manner, was formed on the surface of the plate member. In the practical examples 1 to 3, the plan shape of each conical protrusion was square, and the outer periphery of each conical protrusion was joined to the slopes of adjacent eight conical protrusions. On the other hand, in the practical example 4, the plan shape of each conical protrusion was regular hexagon, and the outer periphery of each conical protrusion was joined to the slopes of adjacent six conical protrusions. Table 1 shows pitches, apex angles and heights of conical protrusions and thicknesses of plate members according to the practical examples 1 to 4.

TABLE 1

|  | Pitch (mm) | Apex Angle (degree) | Height (mm) | Plan Shape | Thickness of Plate Member (mm) |
|---|---|---|---|---|---|
| Practical Example 1 | 0.5 | 60 | 0.61 | Square | 0.59 |
| Practical Example 2 | 0.3 | 60 | 0.37 | Square | 0.83 |
| Practical Example 3 | 0.3 | 90 | 0.21 | Square | 0.99 |
| Practical Example 4 | 0.5 | 60 | 0.50 | Regular Hexagon | 0.70 |

Comparative Example 1

A plate member made of glass-fiber contained polycarbonate according to a comparative example 1 was fabricated as follows.

First, black material was applied to the surface of the plate member made of polycarbonate. Sun coat SR#356 (manufactured by SANESU JUNKATSU, Inc.), exerting an action of reducing reflectance of light, was used as the black material.

(Measurement of Reflectance)

Figure 9:
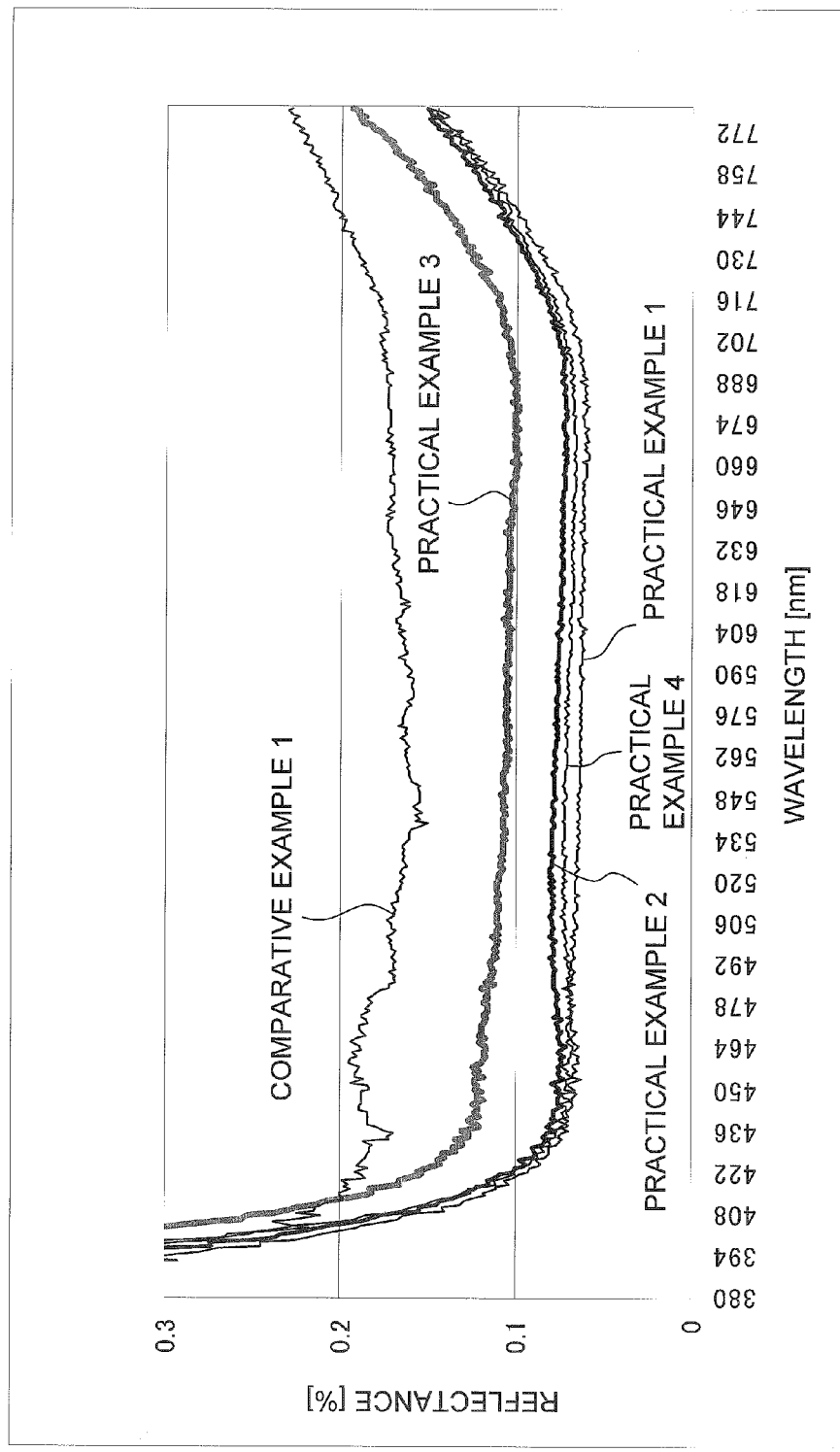
FIG. 9 is a chart for showing measurement results of light reflectance.

Regarding the practical examples 1 to 4 and the comparative example 1, vertical reflectance of visible light (with a wavelength of roughly 390 nm to 780 nm) on the surface was measured by a near-infrared spectroscopy instrument (USPM-RU manufactured by OLYMPUS CORPORATION, using a 20× objective lens). FIG. 9 shows the measurement results. It should be noted that FIG. 9 shows average of 30 samples for each of the practical examples 1 to 4 and the comparative example 1.

As shown in FIG. 9, the reflectance values on the plate member surface according to the practical examples 1 to 4 were less than the reflectance value on the plate member surface according to the comparative example 1. In other words, the surface shape formed by the conical protrusions can remarkably reduce reflectance in comparison with the black painted surface in use for a general lens barrel. Hence, it was confirmed that the surface shape formed by the conical protrusions was suitable for a lens barrel.

Further, as shown in FIG. 9, the reflectance values on the plate member surface according to the practical examples 1, 2 and 4 were less than the reflectance value on the plate member surface according to the practical example 3. In other words, it was confirmed that when the apex angle of each conical protrusion is set to be 60 degrees, reflectance can be reduced than that when the apex angle is set to be 90 degrees.

(Relation Between Height and Strength of Protrusion)

First, the plate member according to the practical example 1 was prepared. As described above, the height of each conical protrusion was 0.61 mm in the practical example 1. Further, a plate member, having protrusions with a height of less than or equal to the wavelength of a predetermined wavelength light, was prepared as a comparative example 2. The height of each protrusion was 300 nm in the comparative example 2.

Next, regarding the practical example 1 and the comparative example 2, vertical reflectance of visible light (with a wavelength of roughly 390 nm to 780 nm) on the surface was measured by the near-infrared spectroscopy instrument (USPM-RU manufactured by OLYMPUS CORPORATION, using the 20× objective lens).

Next, regarding the practical example 1 and the comparative example 2, the surface was horizontally pulled at a load of 150 cN, while being pressed by rubber made of polyvinyl chloride at a load of 100-120 cN.

Figure 10:
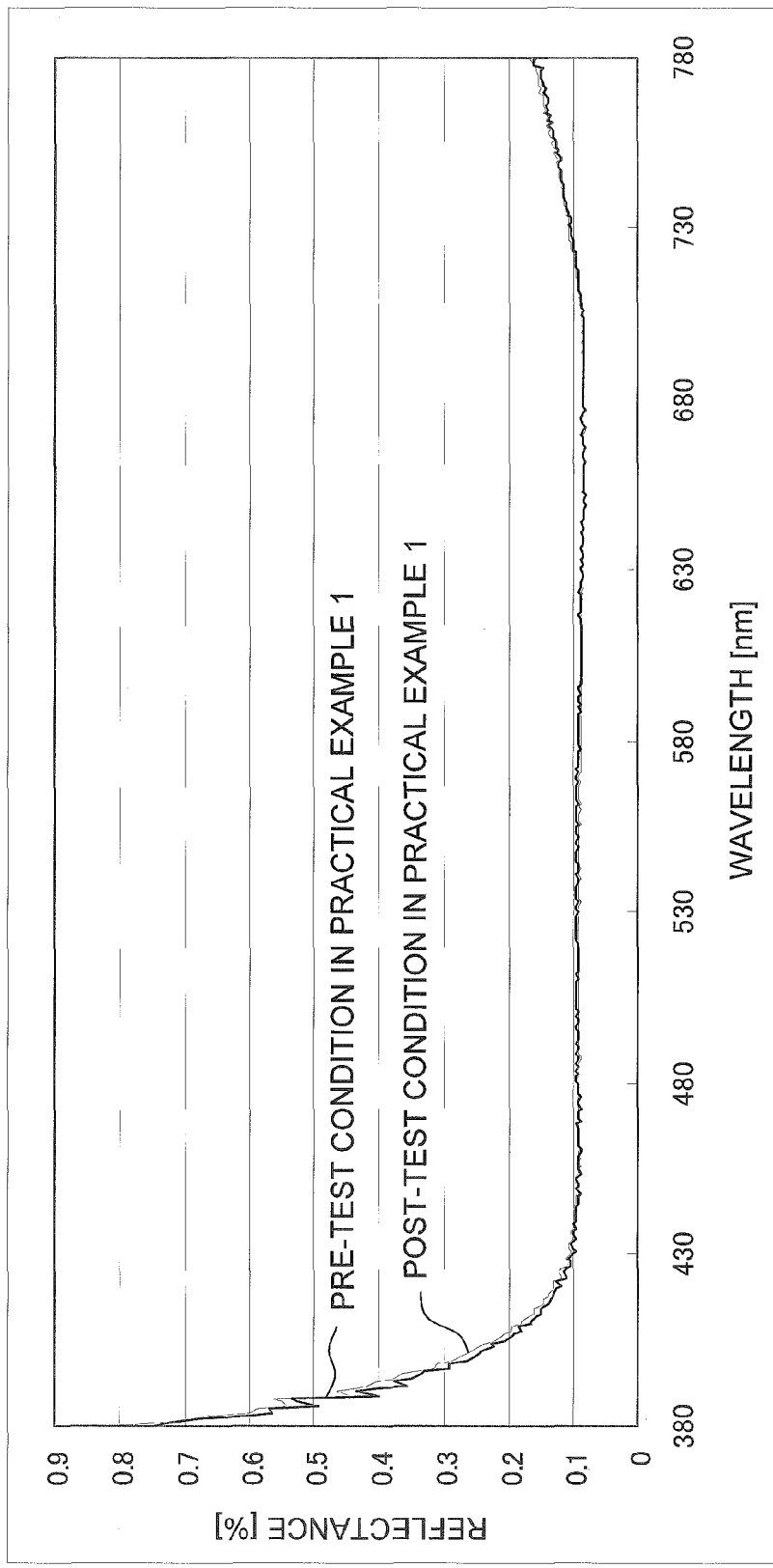
FIG. 10 is a chart for showing variation in light reflectance between pre-and-post conditions in a rubber pressing test in a practical example 1.

Next, regarding the practical example 1 and the comparative example 2, the vertical reflectance within a range of the surface onto which the rubber was pressed was measured by the near-infrared spectroscopy instrument (USPM-RU manufactured by OLYMPUS CORPORATION, using the 20× objective lens). FIG. 10 shows reflectance measurement results of the practical example 1 regarding pre-and-post conditions of the rubber pressing test. Likewise, FIG. 11 shows reflectance measurement results of the comparative example 2 regarding pre-and-post conditions of the rubber pressing test.

As shown in FIG. 10, in the practical example 1, a reflectance, equivalent to that of the pre-condition of the rubber pressing test, was measured even in the post-condition of the rubber pressing test. In other words, it was confirmed that the conical protrusions with a height of 0.61 mm were not damaged or broken in the rubber pressing test.

Figure 11:
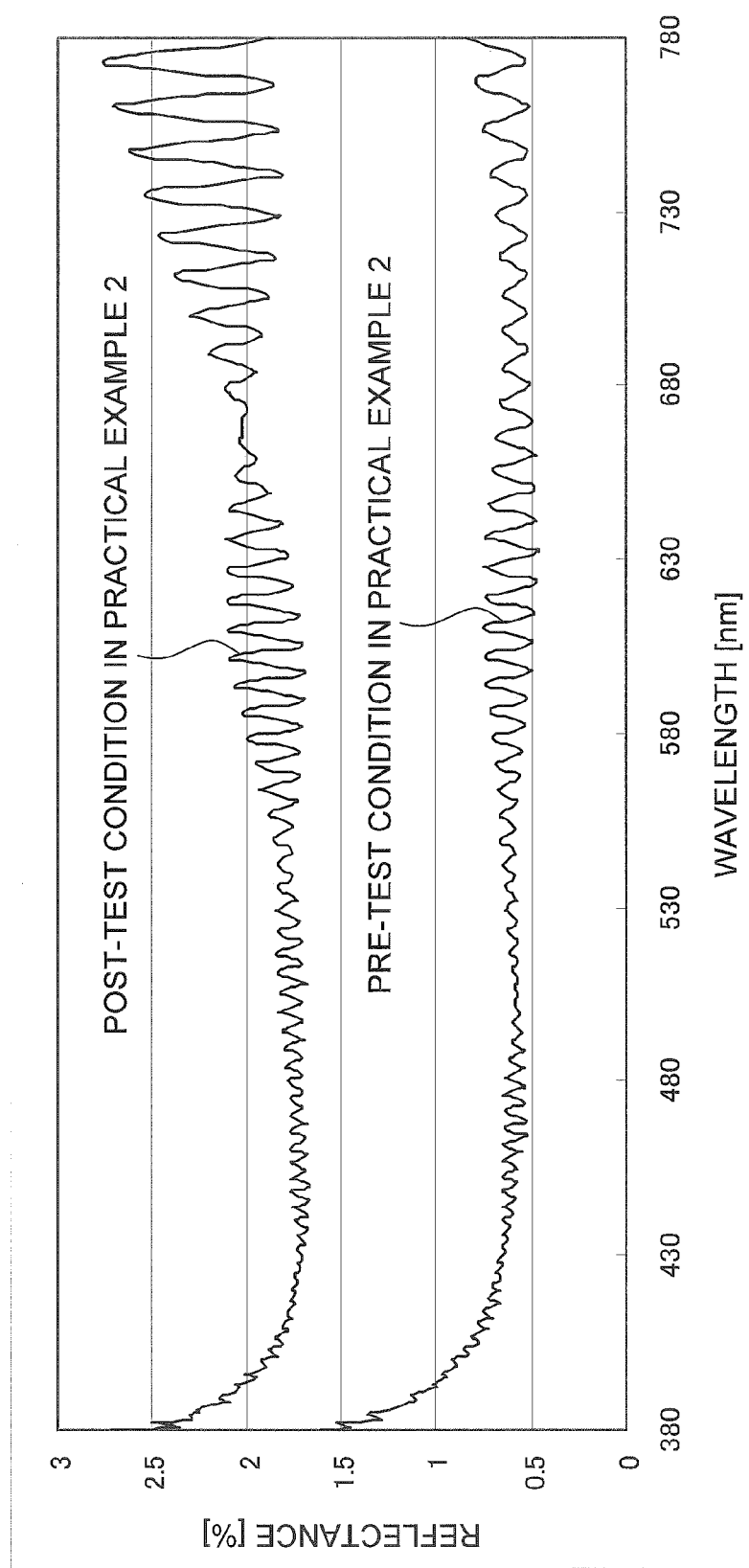
FIG. 11 is a chart for showing variation in light reflectance between pre-and-post conditions in a rubber pressing test in a comparative example 2.

By contrast, as shown in FIG. 11, in the comparative example 2, a reflectance, greater than or equal to three times the reflectance in the pre-condition of the rubber pressing test, was measured in the post-condition of the rubber pressing test. In other words, it was confirmed that minute protrusions with a height of roughly wavelength of light were likely to be damaged or broken in the rubber pressing test.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel. Accordingly, these terms, as utilized to describe the present technology should be interpreted relative to the lens barrel.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

INDUSTRIAL APPLICABILITY

According to the present technology, it is possible to provide a lens barrel having a surface shape with an enhanced strength. Therefore, the present technology can be utilized for the field of optical instruments.

What is claimed is:

1. A lens barrel, comprising:
a housing; and
an inner member being disposed within the housing, wherein
at least either an inner surface of the housing or a surface of the inner member includes a plurality of conical protrusions, the conical protrusions being aligned at a pitch of greater than or equal to 0.1 mm and less than or equal to 2.0 mm and having a surface shape that scatters incident light.

2. The lens barrel according to claim 1, wherein
slopes of the conical protrusions are joined to each other, and each of the conical protrusions having a hexagonal base.

3. The lens barrel according to claim 1, wherein
each of the conical protrusions includes an apex angle of greater than or equal to 30 degrees and less than or equal to 90 degrees.

4. The lens barrel according to claim 3, wherein
each of the conical protrusions includes an apex angle of greater than or equal to 50 degrees and less than or equal to 70 degrees.

5. The lens barrel according to claim 1, wherein
the conical protrusions being aligned at a pitch of greater than or equal to 0.1 mm and less than or equal to 0.7 mm.

6. The lens barrel according to claims 1, wherein
the conical protrusions being aligned at a pitch of greater than or equal to 0.2 mm and less than or equal to 2.0 mm.

7. The lens barrel according to claim 1, wherein
the conical protrusions are made of a fiber contained resin.

8. The lens barrel according to claim 1, wherein
the housing or the inner member includes a inclined surface, the inclined surface being disposed along an outer edge of the conical protrusions, and
the inclined surface is gradually separated away from the conical protrusions in proportion to distance from either the inner surface of the housing or the surface of the inner member.

9. The lens barrel according to claim 8, wherein
the inclined surface is joined to the slope of at least one of the conical protrusions.

* * * * *